(12) United States Patent
Hattori et al.

(10) Patent No.: US 10,596,944 B2
(45) Date of Patent: Mar. 24, 2020

(54) FLOOR CARPET FOR VEHICLES AND METHOD FOR PRODUCING SAME

(71) Applicants: TOYOTA BOSHOKU KABUSHIKI KAISHA, Aichi-ken (JP); OTSUKA CORPORATION, Gifu-ken (JP)

(72) Inventors: Atsuhiro Hattori, Aichi-ken (JP); Kazunori Kawai, Gifu-ken (JP)

(73) Assignees: TOYOTA BOSHOKU KABUSHIKI KAISHA, Aichi-ken (JP); OTSUKA CORPORATION, Gifu-ken (JP)

( * ) Notice: Subject to any disclaimer, the term of this patent is extended or adjusted under 35 U.S.C. 154(b) by 34 days.

(21) Appl. No.: 15/848,681

(22) Filed: Dec. 20, 2017

(65) Prior Publication Data

US 2018/0194256 A1    Jul. 12, 2018

(30) Foreign Application Priority Data

Jan. 11, 2017    (JP) .................................. 2017-002898

(51) Int. Cl.
*B60N 3/04*    (2006.01)
*B32B 3/24*    (2006.01)
(Continued)

(52) U.S. Cl.
CPC .............. *B60N 3/048* (2013.01); *B32B 3/266* (2013.01); *B32B 5/022* (2013.01); *B32B 7/12* (2013.01); *B32B 27/12* (2013.01); *B32B 37/1207* (2013.01); *B32B 37/1284* (2013.01); *B32B 37/15* (2013.01); *B32B 37/153* (2013.01); *B32B 38/0032* (2013.01); *B32B 38/0036* (2013.01); *B60N 3/042* (2013.01); *B32B 5/02* (2013.01); *B32B 5/26* (2013.01); *B32B 27/32* (2013.01);
(Continued)

(58) Field of Classification Search
None
See application file for complete search history.

(56) References Cited

U.S. PATENT DOCUMENTS 3,695,967 A * 10/1972 Ross ........................ B32B 27/00
                                                                 156/209
3,911,186 A * 10/1975 Trotman ................. B32B 27/00
                                                                 428/137

(Continued)

FOREIGN PATENT DOCUMENTS

CN         101596062 A       12/2009
CN         104768749 A        7/2015
(Continued)

OTHER PUBLICATIONS

Machine Translation of JP-01069332-A, Mar. 1989 (Year: 1989).*
Office Action issued in China Counterpart Patent Appl. No. 201810026322.1, dated Sep. 17, 2019.

*Primary Examiner* — Jeffrey A Vonch
(74) *Attorney, Agent, or Firm* — Greenblum & Bernstein, P.L.C.

(57) ABSTRACT

The vehicle floor carpet of the present invention includes a skin layer, a thermoplastic resin layer, and a base layer in this order, the thermoplastic resin layer has a plurality of open hole parts penetrating through the thermoplastic resin layer in the thickness direction, and the open hole parts are arranged on recesses in a surface of the skin layer or recesses in a surface of the base layer at the side of the thermoplastic resin layer.

11 Claims, 3 Drawing Sheets

(51) Int. Cl.
| | |
|---|---|
| *B32B 5/02* | (2006.01) |
| *B32B 5/26* | (2006.01) |
| *B32B 7/12* | (2006.01) |
| *B32B 27/12* | (2006.01) |
| *B32B 37/06* | (2006.01) |
| *B32B 37/10* | (2006.01) |
| *B32B 37/12* | (2006.01) |
| *B32B 37/15* | (2006.01) |
| *B32B 38/00* | (2006.01) |
| *B32B 38/04* | (2006.01) |
| *B32B 3/26* | (2006.01) |
| *B32B 37/00* | (2006.01) |
| *D06N 7/00* | (2006.01) |
| *B32B 27/32* | (2006.01) |

(52) U.S. Cl.
CPC ........... *B32B 37/0053* (2013.01); *B32B 37/06* (2013.01); *B32B 37/10* (2013.01); *B32B 38/04* (2013.01); *B32B 2037/1223* (2013.01); *B32B 2305/026* (2013.01); *B32B 2307/70* (2013.01); *B32B 2307/718* (2013.01); *B32B 2307/724* (2013.01); *B32B 2323/04* (2013.01); *B32B 2323/046* (2013.01); *B32B 2605/003* (2013.01); *D06N 7/0076* (2013.01); *D06N 7/0078* (2013.01); *D06N 7/0081* (2013.01); *D06N 2209/121* (2013.01); *D06N 2209/123* (2013.01); *D06N 2211/261* (2013.01); *D06N 2211/263* (2013.01); *Y10T 428/23986* (2015.04); *Y10T 428/23993* (2015.04); *Y10T 428/24331* (2015.01); *Y10T 428/24562* (2015.01); *Y10T 428/24851* (2015.01); *Y10T 428/273* (2015.01); *Y10T 442/659* (2015.04); *Y10T 442/674* (2015.04); *Y10T 442/678* (2015.04)

(56) References Cited

U.S. PATENT DOCUMENTS

| | | | | |
|---|---|---|---|---|
| 4,726,976 | A * | 2/1988 | Karami | A61F 13/512 428/137 |
| 5,632,844 | A * | 5/1997 | Pate | B32B 5/26 156/290 |
| 6,821,597 | B1 * | 11/2004 | Price | B29C 43/203 428/95 |
| 8,418,806 | B1 * | 4/2013 | Wyerman | G10K 11/002 181/284 |
| 2001/0046587 | A1 * | 11/2001 | Michael | B32B 3/266 428/137 |
| 2003/0152742 | A1 * | 8/2003 | Shimizu | B32B 5/26 428/95 |
| 2004/0037995 | A1 * | 2/2004 | Nicolai | B60N 3/048 428/95 |
| 2004/0131836 | A1 * | 7/2004 | Thompson | B01D 53/228 428/304.4 |
| 2004/0265566 | A1 * | 12/2004 | Wyerman | B29C 43/203 428/317.9 |
| 2005/0075025 | A1 * | 4/2005 | Ueda | B32B 7/02 442/149 |
| 2005/0136212 | A1 * | 6/2005 | Wyerman | B32B 5/26 428/95 |
| 2006/0003142 | A1 * | 1/2006 | Shimizu | B32B 5/022 428/95 |
| 2006/0090832 | A1 * | 5/2006 | Allison | B32B 3/10 156/72 |
| 2007/0065628 | A1 * | 3/2007 | Allison | B32B 3/16 428/95 |
| 2007/0137926 | A1 * | 6/2007 | Albin, Jr. | B60R 13/0815 181/290 |
| 2007/0178794 | A1 * | 8/2007 | Nishio | B32B 27/12 442/394 |
| 2007/0202302 | A1 * | 8/2007 | Matsuura | B32B 3/085 428/174 |
| 2008/0131647 | A1 * | 6/2008 | Shimizu | B60N 3/048 428/87 |
| 2008/0223654 | A1 * | 9/2008 | Juriga | B32B 5/26 181/286 |
| 2008/0274307 | A1 * | 11/2008 | Chereau | B32B 27/12 428/17 |
| 2009/0176050 | A1 * | 7/2009 | Wang | B32B 27/12 428/95 |
| 2009/0176055 | A1 * | 7/2009 | Yada | B32B 3/266 428/138 |
| 2009/0304982 | A1 * | 12/2009 | Hattori | B32B 27/12 428/86 |
| 2011/0165810 | A1 * | 7/2011 | Mori | B32B 3/266 442/396 |
| 2014/0110187 | A1 * | 4/2014 | Sahnoune | D03D 1/0064 181/290 |
| 2014/0174641 | A1 * | 6/2014 | Roman | C08J 5/24 156/182 |
| 2014/0363625 | A1 * | 12/2014 | Huang | B32B 27/12 428/133 |
| 2016/0024708 | A1 * | 1/2016 | McGill | B32B 3/266 428/90 |
| 2017/0361785 | A1 * | 12/2017 | Guigner | B60R 13/083 |
| 2018/0144734 | A1 * | 5/2018 | Wang | B32B 3/266 |
| 2018/0229466 | A1 * | 8/2018 | Hata | B29C 65/028 |

FOREIGN PATENT DOCUMENTS

| | | | |
|---|---|---|---|
| JP | 61020727 U | * | 2/1986 |
| JP | 01063112 A | * | 3/1989 |
| JP | 01063113 A | * | 3/1989 |
| JP | 01063138 A | * | 3/1989 |
| JP | 01069332 A | * | 3/1989 |
| JP | 11301267 A | * | 11/1999 |
| JP | 2000-14522 A | | 1/2000 |
| JP | 2005231467 A | * | 9/2005 |
| JP | 2005273272 A | * | 10/2005 |
| JP | 2005335417 A | * | 12/2005 |
| JP | 2006111256 A | * | 4/2006 |
| JP | 2006137160 A | * | 6/2006 |
| JP | 2007-161153 A | | 6/2007 |
| JP | 2007224704 A | * | 9/2007 |
| JP | 2008044459 A | * | 2/2008 |
| JP | 2008100681 A | * | 5/2008 |
| JP | 2008154921 A | * | 7/2008 |
| JP | 2008184078 A | * | 8/2008 |
| JP | 2008188202 A | * | 8/2008 |
| JP | 2008200288 A | * | 9/2008 |
| JP | 2009137465 A | * | 6/2009 |
| JP | 2009233259 A | * | 10/2009 |
| JP | 2010030474 A | * | 2/2010 |
| JP | 2010260490 A | * | 11/2010 |
| JP | 2010284986 A | * | 12/2010 |
| JP | 2011031649 A | * | 2/2011 |
| JP | 2013007138 A | * | 1/2013 |
| JP | 2016020158 A | * | 2/2016 |
| JP | 2016084104 A | * | 5/2016 |
| KR | 101378790 B1 | * | 3/2014 |
| KR | 20140032776 A | * | 3/2014 |
| KR | 20140114468 A | * | 9/2014 |
| KR | 101447626 B1 | * | 10/2014 |
| WO | WO-2014042311 A1 | * | 3/2014 |

* cited by examiner

FLOOR CARPET FOR VEHICLES AND METHOD FOR PRODUCING SAME

INCORPORATION BY REFERENCE

The present application claims priority under 35 U.S.C. § 119 of Japanese Patent Application No. 2017-2898, filed on Jan. 11, 2017, the disclosure of which is expressly incorporated by reference herein in its entirety.

TECHNICAL FIELD

The present invention relates to a vehicle floor carpet and a method for producing the same.

BACKGROUND ART

In prior art, a vehicle such as an automobile includes a floor carpet having function for absorbing the interior sounds. A known floor carpet is one having a laminate structure composed of a skin layer and a nonwoven fabric layer (sound-absorbing layer) with a permeable adhesive layer sandwiched between them.

Following techniques are known as a method for producing a floor carpet having such a laminate structure. For example, JP-A 2000-14522 discloses a method in which a powdery polyethylene resin or its dispersion is dispersed over the back surface side of a skin layer (or the front surface of a nonwoven fabric layer), heat-melted, and then the nonwoven fabric layer (or skin layer) is stacked thereon, and press-bonded thereto under cooling. In addition, JP-A 2007-161153 discloses a method in which a skin layer and a nonwoven fabric layer are press-bonded with a melt-formed impermeable polyethylene resin layer sandwiched between them, and the polyethylene resin layer is perforated from the outside of the laminate by mechanical perforation using a heated or unheated needle to impart permeability to the adhesive layer composed of a polyethylene resin.

Further, a method is known in which a perforated polyethylene resin film or sheet is inserted between a skin layer and a nonwoven fabric layer, heat-melted, and then press-bonded under cooling.

SUMMARY OF THE INVENTION

In the method of JP-A 2000-14522 that uses a powdery polyethylene resin for the formation of a permeable adhesive layer, however, voids tend to be formed in the adhesive layer. In a case of producing a floor carpet having low permeability (in particular, less than 10 cc/cm$^2$/sec), a basis weight of the adhesive layer is required to increase. Furthermore, a process of crushing resin pellets is necessary for obtaining the powdery polyethylene resin. Therefore, this method is still insufficient from viewpoints of weight reduction, cost reduction, and production efficiency, and has room for improvement.

Additionally, in the method of JP-A 2007-161153 that perforates a polyethylene resin layer from the outside of the laminate for the formation of a permeable adhesive layer, a perforating process and equipments therefor are required. Therefore, this method is still insufficient from viewpoints of cost reduction and production efficiency, and has room for improvement.

Furthermore, in the method using a perforated polyethylene resin film or sheet for the formation of a permeable adhesive layer, the film itself is expensive, and control of the permeability is not easy, and it is economically disadvantageous to provide many types of films. Therefore, this method is still insufficient from viewpoints of controllability of permeability, cost reduction, and production efficiency, and has room for improvement.

The present invention is intended to provide a vehicle floor carpet which has excellent performance balance between permeability and durability, and a method for efficiently producing the vehicle floor carpet which is easy to control the permeability, and has excellent performance balance between permeability and durability.

The vehicle floor carpet of the present invention is including a skin layer, a thermoplastic resin layer, and a base layer in this order, and is characterized in that the thermoplastic resin layer has a plurality of open hole parts penetrating through the thermoplastic resin layer in the thickness direction, and that the open hole parts are arranged on recesses in a surface of the skin layer or recesses in a surface of the base layer at the side of the thermoplastic resin layer.

A permeability of the vehicle floor carpet is preferably in a range from 5 to 30 cc/cm$^2$/sec.

The production method of the vehicle floor carpet of the present invention is characterized in that the method includes the successive steps of (a) forming a laminate including a skin layer, a thermoplastic resin layer, and a base layer in this order, (b) heating the laminate to form a plurality of open hole parts penetrating through the thermoplastic resin layer in the thickness direction, and (c) press-molding a laminate having open hole parts, that the step (a) forms the thermoplastic resin layer by extruding a thermoplastic resin in a molten state with an extruder, and that the step (a) forms the laminate in which the skin layer and the base layer is bonded via the thermoplastic layer so that non-contact parts are formed at at least one of an interface between the skin layer and the thermoplastic resin layer, and an interface between the thermoplastic resin layer and the base layer.

A film forming temperature for the thermoplastic resin layer in the step (a) is preferably in a range from 200° C. to 220° C.

A basis weight of the thermoplastic resin layer in the step (a) is preferably in a range from 50 to 150 g/m$^2$.

Advantageous Effects of the Invention

The vehicle floor carpet of the present invention includes a thermoplastic resin layer having a plurality of open hole parts penetrating therethrough in the thickness direction. Therefore, the vehicle floor carpet has excellent performance balance between permeability and durability. Furthermore, the thermoplastic resin layer allows easy control of the permeability.

According to the production method of a vehicle floor carpet in the present invention, a vehicle floor carpet can be efficiently obtained in which a permeability can be easily controlled, and performance balance between permeability and durability is excellent. In addition, the basis weight of the thermoplastic resin layer can be more reduced than prior art, which allows further weight reduction of the vehicle floor carpet. Furthermore, since a general-purpose extruder and a general-purpose thermoplastic resin may be used, the present method is advantageous in terms of cost.

In the case where the film forming temperature for the thermoplastic resin layer in the step (a) is in a range from 200° C. to 220° C., the permeability of the vehicle floor carpet can be easily controlled.

In the case where the basis weight of the thermoplastic resin layer in the step (a) is in a range from 50 to 150 g/m$^2$, weight reduction of the vehicle floor carpet can be achieved, and the permeability can be easily controlled.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Vehicle Floor Carpet

Figure 1:
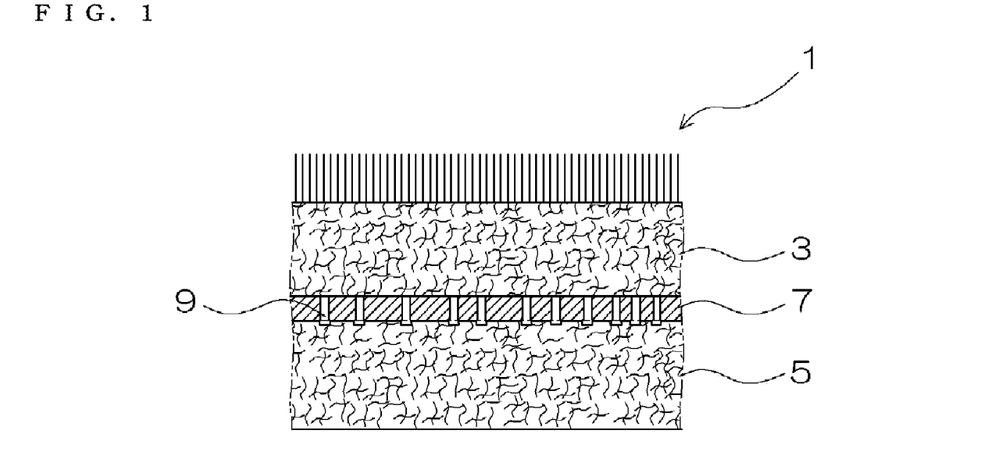
FIG. 1 is a schematic cross sectional view for illustrating one example of a vehicle floor carpet.

The vehicle floor carpet (1) according to an embodiment 1 includes a skin layer (3), a thermoplastic resin layer (7), and a base layer (5) in this order (see FIG. 1). The thermoplastic resin layer (7) has a plurality of open hole parts (9) penetrating through the thermoplastic resin layer in the thickness direction, and the open hole parts (9) are arranged on recesses in a surface of the skin layer (3) or recesses in a surface of the base layer (5) at the side of the thermoplastic resin layer (see FIGS. 1 and 2).

A structure, size, shape, and material of the skin layer (3) are not particularly limited. For example, the skin layer (3) may be derived from a known permeable skin material (3a) (described later) such as a needle punched nonwoven fabric and a tufted carpet. These skin materials may be coated with a synthetic resin latex for increasing durability.

A structure, size, shape, and material of the base layer (5) are not particularly limited. For example, the base layer (5) may be derived from a known permeable base material (5a) (described later) such as a nonwoven fabric including a needle punched nonwoven fabric and a fabric of compressed felt used for reinforcement.

A material and a fiber fineness of the nonwoven fabric are not particularly limited. The fiber fineness is preferably in a range from 0.5 to 33 dtex, more preferably from 2.2 to 17 dtex, and further preferably from 3.3 to 11 dtex, from viewpoints of sound absorption and shape retention.

A size and shape of the thermoplastic resin layer (7) are not particularly limited. The material composing the thermoplastic resin layer (7) may be just a thermoplastic resin or a thermoplastic resin composition which is as necessary filled with a powder such as calcium carbonate and barium sulfate. Specific examples of the thermoplastic resin include a polyethylene such as a high density polyethylene (HDPE), a low density polyethylene (LDPE), a linear short chain branching polyethylene (LLDPE), and mixtures of these various types of polyethylene; a polypropylene; an ethylene-vinyl acetate copolymer; and the like. Among them, a low density polyethylene is preferred from viewpoints of excellent film-forming ability and floor carpet formability, high versatility, low cost, and easy availability.

The above thermoplastic resins may be used singly or in combination of two or more types thereof.

Figure 2:
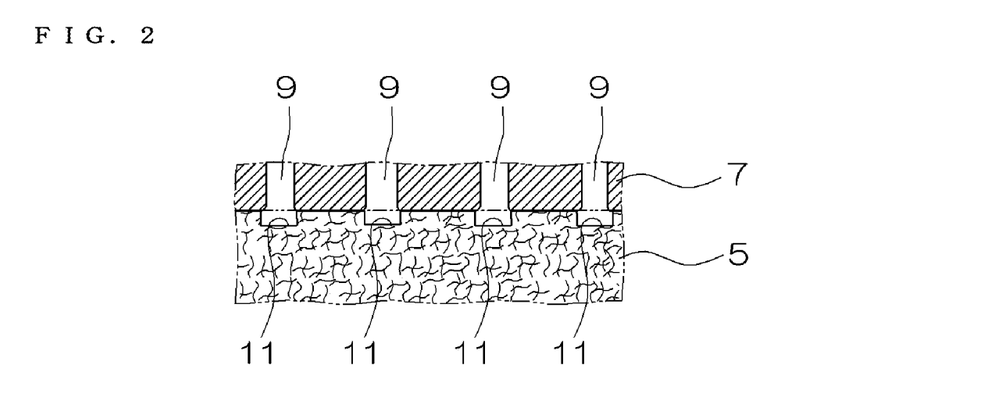
FIG. 2 is a schematic cross sectional view for illustrating open hole parts in the thermoplastic resin layer.

The thermoplastic resin layer (7) has a plurality of open hole parts (9) penetrating through the thermoplastic resin layer in the thickness direction. Positions of the open hole parts (9) are not particularly limited. When the thermoplastic resin layer (7) is viewed from above side of the vehicle floor carpet, the open hole parts (9) may be regularly arranged or randomly arranged. A distance between one open hole part and the adjacent open hole part is not particularly limited.

A plurality of the open hole parts (9) are arranged on recesses (11) in a surface of the skin layer (3) or recesses (11) in a surface of the base layer (5) at the side of the thermoplastic resin layer (see FIG. 2 which schematically illustrates the open hole parts (9) formed on the recesses (11) of the base layer (5)).

The term "recesses in a surface" on the skin layer (3) or the base layer (5) means fine recesses which are present in the surfaces of the layers because the material composing these layers is a fiber material such as a nonwoven fabric.

The open hole parts (9) are not formed from the outside of the skin layer (3) or the base layer (5) by regular perforation using a needle or the like, but are formed when a laminate having a skin layer (31), a thermoplastic resin layer (71) and a base layer (51) is heated during the production process (described later).

In the vehicle floor carpet (1), the open hole parts (9) in the thermoplastic resin layer (7) control the permeability.

In the vehicle floor carpet (1) according to the embodiment 1, a permeability from one side to the other side may be in a range from 5 to 30 cc/cm$^2$/sec, preferably from 10 to 25 cc/cm$^2$/sec, and particularly from 15 to 20 cc/cm$^2$/sec.

The permeability is a value measured in accordance with JIS L 1096 8.26.1 (Frazier form method).

In addition, in the vehicle floor carpet (1) according to the embodiment 1, a peeling strength between the skin layer (3) and the base layer (5) may be in a range from 10 to 58 N, and preferably from 22 to 32 N.

The peeling strength is a value measured in accordance with JIS L 1086 7.10.1 (peeling intensity in a reference state). The tension rate is 20 cm per minute, and the average of the maximum values is calculated.

A production method of the vehicle floor carpet (1) according to the embodiment 1 is not particularly limited. The vehicle floor carpet (1) can be produced by a following method for producing a vehicle floor carpet according to an embodiment 2.

2. Production Method of Vehicle Floor Carpet

Figure 3:
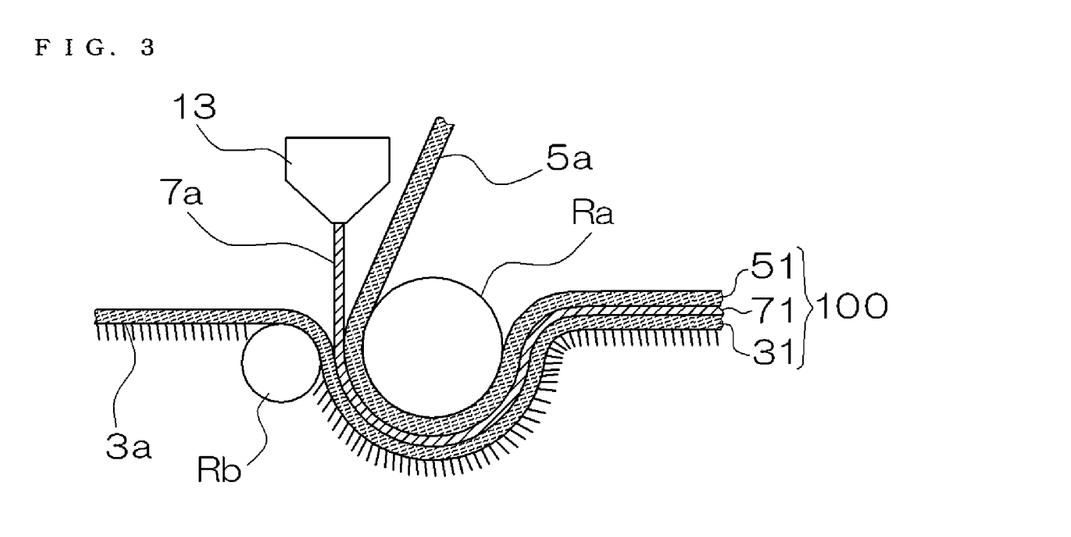
FIG. 3 is a schematic view for illustrating a production method of a laminate used for producing the vehicle floor carpet.
Figure 4:
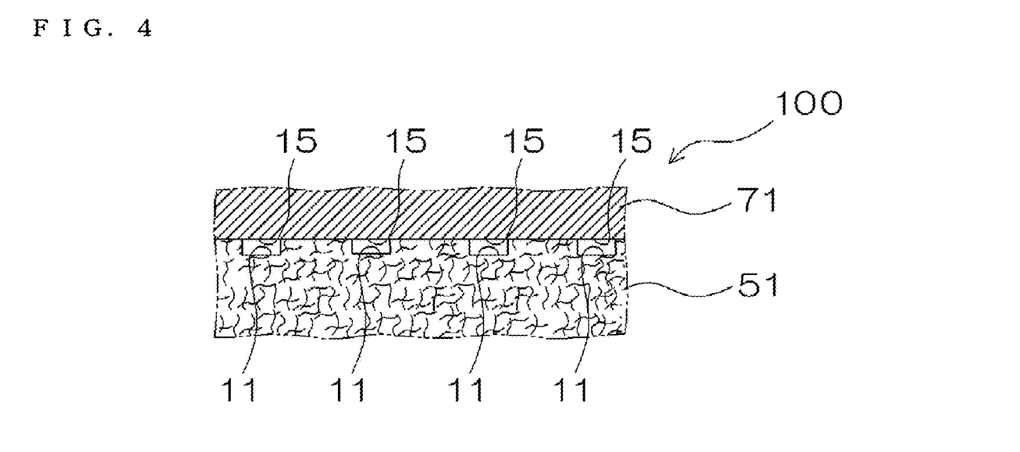
FIG. 4 is a schematic cross sectional view for illustrating non-contact parts in the laminate.
Figure 5:
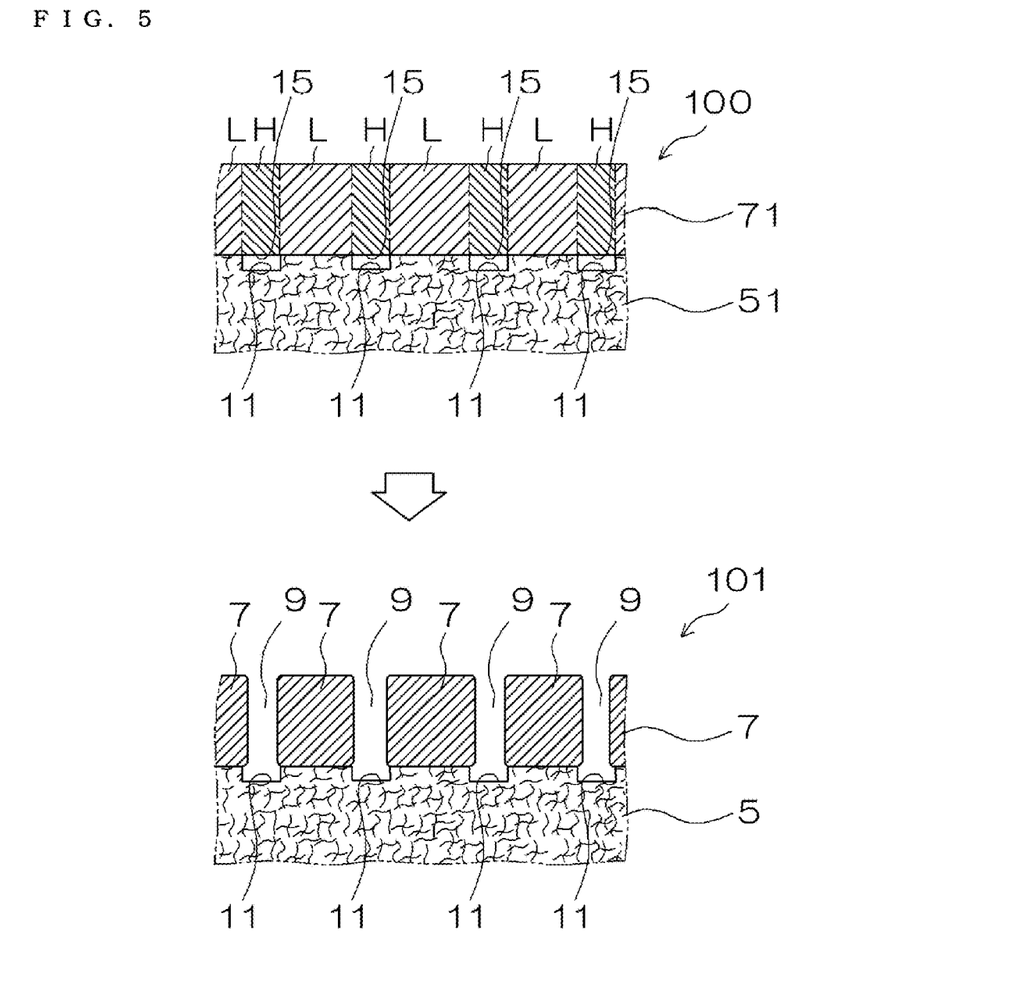
FIG. 5 is a schematic cross sectional view for illustrating formation of the open hole parts.

A method for producing a vehicle floor carpet according to the embodiment 2 is a method for producing a vehicle floor carpet (1) including a skin layer (3), a thermoplastic resin layer (7), and a base layer (5) in this order, and includes the steps of (a) forming a laminate (100) including a skin layer (31), a thermoplastic resin layer (71), and a base layer (51) in this order;

(b) heating the laminate (100) to form a plurality of open hole parts (9) penetrating through the thermoplastic resin layer (71) in the thickness direction; and (c) press-molding a laminate having open hole parts, wherein the step (a) forms the thermoplastic resin layer (71) by extruding a thermoplastic resin (7a) in a molten state with an extruder (13), and wherein the step (a) forms the laminate (100) in which the skin layer (31) and the base layer (51) is bonded via the thermoplastic layer (71) so that non-contact parts are formed at at least one of an interface between the skin layer (31) and the thermoplastic resin layer (71), and an interface between the thermoplastic resin layer (71) and the base layer (51) (see FIGS. 3 to 5).

The step (a) is a step in which a laminate (100) including a skin layer (31), a thermoplastic resin layer (71), and a base layer (51) in this order.

The laminate (100) can be obtained by a method in which a thermoplastic resin (7a) in a molten state is extruded between a skin material (3a) for the skin layer (3) and a base material (5a) for the base layer (5) using a general-purpose extruder (13) such as a T-die extrusion laminator, a pair of rollers (Ra and Rb) are used for press-bonding, and cooling is conducted as necessary to form the thermoplastic resin layer (71) (see FIG. 3).

Alternatively, the laminate (100) can be obtained by a method in which a thermoplastic resin (7a) in a molten state is extruded on a skin material (3a) using a general-purpose extruder (13) such as a T-die extrusion laminator, the base material (5a) is stacked thereon, the skin material (3a), the thermoplastic resin (7a) and the base material (5a) are press-bonded, and cooling is conducted as necessary to form the thermoplastic resin layer (71).

Yet alternatively, the laminate (100) can be obtained by a method in which a thermoplastic resin (7a) in a molten state is extruded on the base material (5a) by a general-purpose extruder (13) such as a T-die extrusion laminator, a skin material (3a) is stacked thereon, the skin material (3a), the thermoplastic resin (7a) and the base material (5a) are press-bonded, and cooling is conducted as necessary to form the thermoplastic resin layer (71).

As the skin material (3a), a known permeable skin material may be used such as a needle punched nonwoven fabric and a tufted carpet. These skin materials may be coated with a synthetic resin latex for increasing durability.

A basis weight of the skin layer (31) in the laminate (100) is not particularly limited and is preferably in a range from 100 to 1000 g/m$^2$.

Specific examples of the tufted carpet include one that is composed of a base cloth having a basis weight of 100 to 150 g/m$^2$ and piles having a basis weight of 250 to 850 g/m$^2$, and one that is as necessary coated to this laminate with a synthetic resin latex at a basis weight of 30 to 100 g/m$^2$.

In addition, specific examples of the needle punched nonwoven fabric include one that is composed of cotton having a basis weight of 100 to 500 g/m$^2$, and one that is as necessary coated to the cotton sheet with a synthetic resin latex at a basis weight of 200 g/m$^2$ or less.

As the base material (5a), a nonwoven fabric such as a needle punched nonwoven fabric and a fabric of compressed felt used for reinforcement may be used.

A material and a fiber fineness of the nonwoven fabric are not particularly limited. The fiber fineness is preferably in a range from 0.5 to 33 dtex, more preferably from 2.2 to 17 dtex, and further preferably from 3.3 to 11 dtex, from viewpoints of sound absorption, shape retention, and dimensional stability during molding processing.

In addition, a basis weight of the base layer (51) in the laminate (100) is not particularly limited and is preferably in a range from 100 to 1000 g/m$^2$ and more preferably from 300 to 800 g/m$^2$, from viewpoints of sound absorption, shape retention, and dimensional stability during molding processing.

The thermoplastic resin (7a) used for the formation of the thermoplastic resin layer (71) may be of a thermoplastic resin or a thermoplastic resin composition. Examples of the thermoplastic resin include a polyethylene such as a high density polyethylene (HDPE), a low density polyethylene (LDPE), a linear short chain branching polyethylene (LLDPE), and mixtures of these various types of polyethylene; a polypropylene; an ethylene-vinyl acetate copolymer; and the like. Among them, a low density polyethylene is preferred from viewpoints of excellent film-forming ability and floor carpet formability, high versatility, low cost, and easy availability.

The above thermoplastic resins may be used singly or in combination of two or more types thereof.

When a thermoplastic resin composition is used to form the thermoplastic resin layer (71), the composition may include, as necessary, a powder such as calcium carbonate and barium sulfate.

A melt flow rate of the thermoplastic resin or thermoplastic resin composition is not particularly limited. In a case where the thermoplastic resin is a polyethylene, the melt flow rate is preferably in a range from 2 to 100, more preferably 4 or higher and less than 50, and further preferably 5 or higher and less than 10 (in accordance with JIS K 7210, unit: g/10 minutes (190° C.)).

When the melt flow rate is within the above-described range, non-contact parts (15) can be easily formed in the laminate (100).

In the production method of a vehicle floor carpet according to the embodiment 2, when the basis weight of the thermoplastic resin layer (71) in the laminate (100) is adjusted, a weight of the vehicle floor carpet can be reduced and a permeability can be controlled. Specifically, the permeability can be decreased by increasing the basis weight, and the permeability can be increased by decreasing the basis weight.

The basis weight of the thermoplastic resin layer (71) is preferably in a range from 50 to 150 g/m$^2$, more preferably from 80 to 120 g/m$^2$, and further preferably 90 to 110 g/m$^2$.

When the basis weight is within the above-described range, the weight can be reduced, and the permeability can be easily controlled.

In a case of forming a laminate (100) in which a skin material (3a) and a base material (5a) are bonded via the thermoplastic resin layer (71) in the step (a), the skin layer (31) and the base layer (51) is bonded via the thermoplastic layer (71) so that non-contact parts (15) are formed at at least one of an interface between the skin layer (31) and the thermoplastic resin layer (71), and an interface between the thermoplastic resin layer (71) and the base layer (51).

Specifically, the non-contact parts (15) are formed by press-bonding the skin material (3a) and the base material (5a) under an intentionally low pressure (preferably 0.1 to 1.5 MPa, more preferably 0.2 to 0.8 MPa, and further preferably 0.4 to 0.6 MPa) in such a manner the thermoplastic resin (7a) in a molten state will not conform to or penetrate into the surface of the skin material (3a) or the base material (5a), and floating regions (voids) are formed at the interfaces after film formation (see FIG. 4 which schematically illustrates the non-contact parts (15) formed at the interface between the base layer (51) and the thermoplastic resin layer (71) without indicating the skin layer (31)).

In the production method of a vehicle floor carpet according to the embodiment 2, when the peeling strength between the skin layer (31) and the base layer (51) of the laminate (100) formed in the step (a) is adjusted, the permeability of the vehicle floor carpet can be controlled. Specifically, when the peeling strength of the laminate (100) is increased, the permeability can be decreased. And when the peeling strength is decreased, the permeability can be increased.

The peeling strength can be adjusted by selecting a type of the thermoplastic resin to be used (in particular, in consideration of melting point and melt flow rate), or adjusting the pressure when the skin material (3a) and the base material (5a) are bonded together with the thermoplastic resin layer (71) sandwiched between them, and the film forming temperature of the thermoplastic resin layer (71).

The peeling strength of the skin layer (31) and the base layer (51) of the laminate (100) is preferably in a range from 4 to 30 N, and more preferably from 14 to 20 N.

When the peeling strength is within the above-described range, formability of the non-contact parts (15) is favorable, and the permeability of a vehicle floor carpet to be obtained can be easily controlled. Furthermore, a vehicle floor carpet having sufficient durability and sufficient permeability without problems such as peeling is obtained. More specifically, a vehicle floor carpet having excellent performance balance between permeability and durability is obtained.

In the production method of a vehicle floor carpet according to the embodiment 2, when the film forming temperature of the thermoplastic resin layer (71), that is to say, the temperature of the thermoplastic resin (7a) in a molten state when extruded in the step (a) is adjusted, the permeability of the vehicle floor carpet can be controlled. Specifically, when the film forming temperature is increased, the permeability can be decreased. And when the film forming temperature is decreased, the permeability can be increased.

The film forming temperature of the thermoplastic resin layer (71) is preferably in a range from 200° C. to 220° C.

When the film forming temperature is within the above-described range, formability of the non-contact parts (15) is favorable, and the permeability of a vehicle floor carpet to be obtained can be easily controlled.

The step (b) is a step in which the laminate (100) obtained in the step (a) is subjected to heating to form a plurality of open hole parts (9) penetrating through the thermoplastic resin layer (71) in the thickness direction.

It is expected that the formation of the open hole parts (9) is influenced by an occurrence of regions having varying thermal conductivity in the thickness direction because of the presence of the non-contact parts (15) in the thermoplastic resin layer (71). When the laminate (100) is heated, voids due to the non-contact parts (15) at an interface between the thermoplastic resin layer (71) and the base layer (51) or the skin layer (31) function as a heat-insulating layer. Therefore, a high temperature region (H) located above the non-contact parts (15) and a low temperature region (L) except for the high temperature region (H) are formed in the thermoplastic resin layer (71) (see FIG. 5). A resin in the high temperature region (H) melts at first, and a force acts so as to minimize an interface energy of the melt resin, which likely contributes the formation of the open hole parts (9).

Accordingly, the open hole parts (9) are formed on recesses (11) in the surface of the skin layer (31) and/or the base layer (51) at the side of the thermoplastic resin layer (71).

A heating temperature for the laminate (100) in the step (b) is not particularly limited and is appropriately selected by, for example, a melting point of the thermoplastic resin composing the thermoplastic resin layer (71). Specifically, the heating temperature may be 150° C. or higher, and is preferably in a range from 150° C. to 210° C. and more preferably from 160° C. to 180° C. When the heating temperature is within the above-described range, open hole parts (9) are favorably formed.

A heating time is not particularly limited and is preferably in a range from 20 to 90 seconds and more preferably from 30 to 60 seconds. When the heating time is within the above-described range, open hole parts (9) are favorably formed.

A permeability of a laminate (hereinafter, referred to as "laminate (101)") having the open hole parts (9) formed in the step (b) is preferably set to be higher than the use conditions of the vehicle floor carpet to be obtained (normally 3.0 times or less, preferably from 1.1 to 2.0 times, and more preferably from 1.2 to 1.5 times), in consideration that it may be decreased by the press-molding in the subsequent process.

Specifically, the permeability of the laminate (101) having the open hole parts (9) may be in a range from 5 to 30 cc/cm$^2$/sec, and is preferably from 10 to 25 cc/cm$^2$/sec and more preferably from 15 to 20 cc/cm$^2$/sec.

A peeling strength between the skin layer (31) and the base layer (51) of the laminate (101) having the open hole parts (9) formed in the step (b) is preferably in a range from 6 to 48 N, and more preferably from 20 to 27 N.

When the peeling strength is within the above-described range, a vehicle floor carpet having sufficient durability and sufficient permeability without problems such as peeling is obtained. More specifically, a vehicle floor carpet having excellent performance balance between permeability and durability is obtained.

The step (c) is a step in which the laminate (101) having the open hole parts (9) formed in the step (b) is subjected to press-molding. This step (c) sufficiently press-bonds the base layer (51) and the skin layer (31), whereby the vehicle floor carpet (1) having improved durability and a desired shape is obtained.

Press-molding may use a known method, and the press conditions are adjusted as needed according to the intended shape and others.

A permeability of the vehicle floor carpet (1) obtained in the step (c) may be in a range from 5 to 30 cc/cm²/sec, and is preferably from 10 to 25 cc/cm²/sec and more preferably from 15 to 20 cc/cm²/sec.

Furthermore, a peeling strength between the skin layer (31) and the base layer (51) of the vehicle floor carpet (1) obtained in the step (c) may be in a range from 10 to 58 N and is preferably from 22 to 32 N.

The numerals in parentheses in the structures mentioned in the above-described embodiments show the correspondence with the specific structures mentioned in Examples to be described.

EXAMPLES

The invention is further described below by way of Examples.

1. Example 1 (No. 1 to 3)

1-1. Production of Vehicle Floor Carpet

Firstly, a general-purpose T-die extrusion backing line including a pair of press bonding cooling rollers Ra and Rb, and an extruder 13 (a T-die extrusion laminator) were used to form a laminate 100 (see FIG. 3). Specifically, a thermoplastic resin 7a in a molten state was extruded between a skin material 3a and a base material 5a by an extruder 13. The film forming temperature was 200° C. to 220° C. (see Table 1). After that, the laminate was subjected to press-bonding at an intentionally low pressure (0.5 MPa) between a pair of rollers Ra and Rb (gap: 2.2 mm), and cooling to form a thermoplastic resin layer 71 having a basis weight of 100 g/m² and a laminate 100 having non-contact parts 15 at each interface (see FIG. 4).

Figure 6:
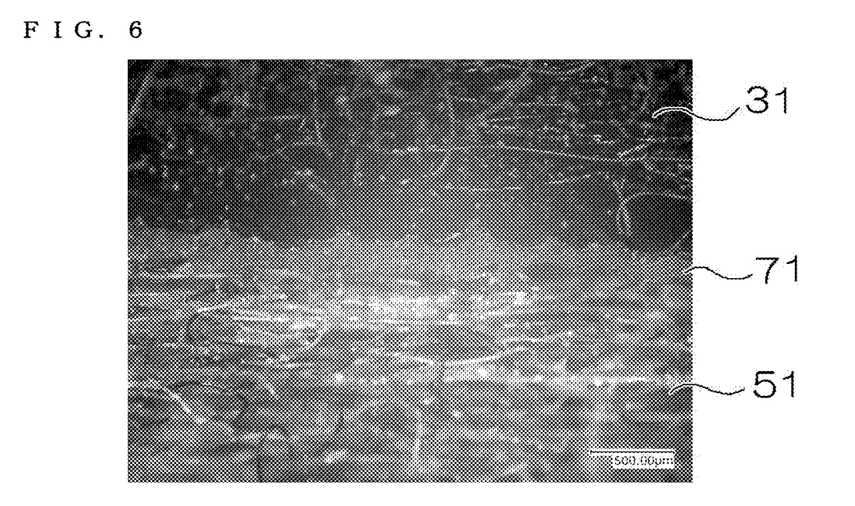
FIG. 6 is an image showing a cross section of a laminate before heating in Example 1.

It was confirmed that the laminate 100 was impermeable, and the thermoplastic resin layer 71 was nonporous. In addition, when another laminate 100 was made in a similar way and its cross section was observed by SEM (magnification: 100 times), the result indicated that the thermoplastic resin layer 71 was nonporous (see FIG. 6).

Subsequently, the laminate 100 thus obtained was heated at temperatures from 150° C. to 210° C. for 60 seconds (see Table 1) to form a laminate 101 having a plurality of open hole parts 9 penetrating through the thermoplastic resin layer 71 in the thickness direction (see FIG. 5).

Figure 7:
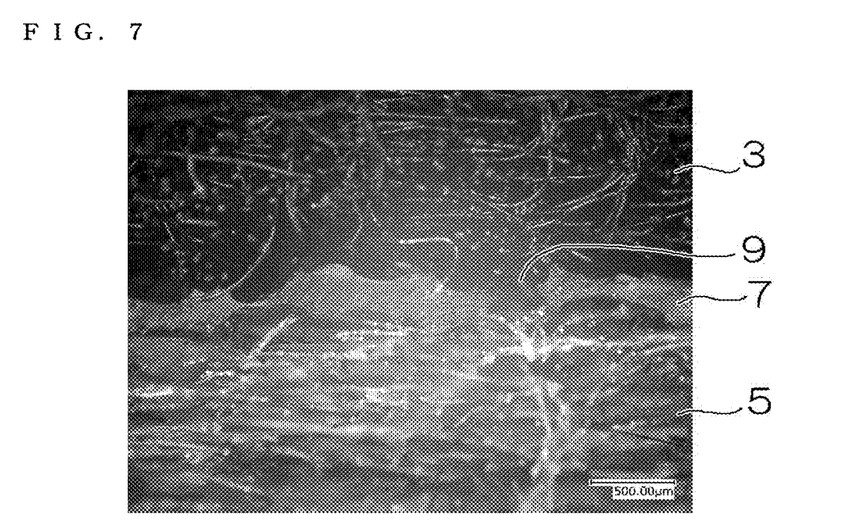
FIG. 7 is an image showing a cross section of the laminate after heating in Example 1.

The permeability of the laminate 101 after heating was measured. The result is shown in Table 1. In addition, when another laminate 101 was made in a similar way and its cross section was observed by SEM (magnification: 100 times), it was confirmed that the open hole parts 9 were formed on the recesses 11 in the surface of the base layer 51 at the side of the thermoplastic resin layer 71 (see FIG. 7). Furthermore, another laminate 101 was made in a similar way and the peeling strength between the skin layer and the base layer was measured. The result is shown in Table 1.

Thereafter, the laminate 101 having the open hole parts 9 was subjected to press-molding (flat shape, thickness: 6.5 mm) using a pair of forming dies (die temperature: 15° C.) under the following conditions.

Heating temperature (at the time of completion of heating): from 150° C. to 210° C. (see Table 1)

Temperature during molding: 130° C. to 190° C. (lower than the temperature at the time of completion of heating by 20° C.)

Applied pressure: 5 kPa

Press cooling time: 60 seconds

In this manner, a vehicle floor carpet 1 including the skin layer 3, the thermoplastic resin layer 7 having the open hole parts 9, and the base layer 5 in this order was produced (see FIGS. 1 and 2).

The vehicle floor carpet 1 thus obtained was measured for permeability and peeling strength between the skin layer 3 and the base layer 5. The results are shown in Table 1.

Details of the skin material, the base material, and the thermoplastic resin used for the formation of the thermoplastic resin layer, the method for measuring the permeability, and the method for measuring the peeling strength for this Example 1 are as follows.

Skin material (a material for designed skin layer): needle punched nonwoven fabric (composition: 45% of polyester staple (11 dtex, 64 mm), 45% of polyester staple (6.6 dtex, 51 mm), and 10% of low melting point modified polyester staple (4.4 dtex), basis weight: 350 g/m²)

Base material (a material for shape retention layer): needle punched nonwoven fabric (composition: 60% of polyester staple (6.6 dtex, 51 mm), and 40% of low melting point modified polyester staple (4.4 dtex), basis weight: 500 g/m²)

Thermoplastic resin: low density polyethylene, melting point: 107° C., melt flow rate (190° C.): 5 g/10 min.

The permeability was measured in accordance with JIS L 1096 8.26.1 (Frazier form method).

The peeling strength was measured in accordance with JIS L 1086 7.10.1 (peeling strength in a reference state). The tension rate was 20 cm per one minute, and the average of the maximum values was calculated.

TABLE 1

| | | | No. 1 Film forming temperature: 200° C. | | No. 2 Film forming temperature: 210° C. | | No. 3 Film forming temperature: 220° C. | |
|---|---|---|---|---|---|---|---|---|
| | | | Peeling strength (N) | Permeability (cc/cm²/sec) | Peeling strength (N) | Permeability (cc/cm²/sec) | Peeling strength (N) | Permeability (cc/cm²/sec) |
| Laminate before press molding | Heating temperature | 150° C. | 22.07 | 35.25 | 23.64 | 14.09 | — | — |
| | | 170° C. | 22.60 | 36.03 | 23.97 | 19.90 | 24.04 | 16.93 |
| | | 190° C. | 23.55 | 28.90 | — | — | 25.26 | 6.89 |
| | | 210° C. | — | — | — | — | 25.25 | 9.44 |
| Vehicle floor carpet | Heating temperature | 150° C. | 23.15 | 8.82 | 25.92 | 3.25 | 27.06 | 0.43 |
| | | 170° C. | 22.51 | 14.35 | 24.96 | 7.15 | 25.17 | 3.17 |
| | | 190° C. | 23.73 | 10.03 | 26.85 | 6.15 | 27.86 | 1.66 |
| | | 210° C. | 25.24 | 2.49 | 26.36 | 2.92 | 30.08 | 1.67 |

The measurement values under the respective conditions shown in Table 1 are the averages when two to five objects were made under the same conditions.

1-2. Effect of Example 1

It is clear from results in Table 1 that vehicle floor carpets having excellent performance balance between permeability and durability were efficiently produced by forming the open hole parts 9 in the thermoplastic resin layer 71 in the heating process. Furthermore, use of the general-purpose production line and the general-purpose thermoplastic resin allowed the production of vehicle floor carpets having excellent performance balance between permeability and durability at a lower cost than prior art.

Additionally, it was confirmed that when the film forming temperature for the thermoplastic resin layer 71 is changed, the permeability of the vehicle floor carpet can be controlled. Specifically, it was confirmed that the permeability can be decreased by increasing the film forming temperature, and the permeability can be increased by decreasing the film forming temperature.

2. Example 2 (No. 4 to 33)

2-1. Production of Vehicle Floor Carpet

Firstly, a general-purpose T-die extrusion backing line including a pair of press bonding cooling rollers Ra and Rb, and an extruder 13 (a T-die extrusion laminator) were used to form a laminate 100 (see FIG. 3). Specifically, a thermoplastic resin 7a in a molten state was extruded between a skin material 3a and a base material 5a by an extruder 13. The film forming temperature was 200° C. to 220° C. (see Tables 2 to 4). After that, the laminate was subjected to press-bonding at an intentionally low pressure (0.1 to 1.5 MPa) between a pair of rollers Ra and Rb (gap: 2.2 to 3.0 mm (see Tables 2 to 4)), and cooling to form a thermoplastic resin layer 71 having a basis weight of 100 to 150 g/m² and a laminate 100 having non-contact parts 15 at each interface (see FIG. 4).

Subsequently, the laminate 100 thus obtained was heated at temperatures from 150° C. to 210° C. for 60 seconds (see Table 1) to form a laminate 101 having a plurality of open hole parts 9 penetrating through the thermoplastic resin layer 71 in the thickness direction (see FIG. 5).

The permeability of the laminate 101 after heating was measured. The results are shown in Tables 2 to 4.

Thereafter, the laminate 101 having the open hole parts 9 was subjected to press-molding (flat shape, thickness: 6.5 mm) using a pair of forming dies (die temperature: 15° C.) under the following conditions.

Heating temperature (at the time of completion of heating): from 150° C. to 210° C. (see Tables 2 to 4)

Temperature during molding: 130° C. to 190° C. (lower than the temperature at the time of completion of heating by 20° C.)

Applied pressure: 5 kPa

Press cooling time: 60 seconds

In this manner, a vehicle floor carpet 1 including the skin layer 3, the thermoplastic resin layer 7 having the open hole parts 9, and the base layer 5 in this order was produced (see FIGS. 1 and 2).

The vehicle floor carpet 1 thus obtained was measured for permeability and peeling strength between the skin layer 3 and the base layer 5. The results are shown in Tables 2 to 4.

Details of the thermoplastic resin used for the formation of the thermoplastic resin layer for this Example 2 are as follows. The skin material and the base material are the same as those in Example 1. Furthermore, the method for measuring the permeability is the same as in Example 1.

<Thermoplastic Resin>

A) Low density polyethylene (LDPE), melting point: 110° C., melt flow rate: 5 g/10 min at 190° C.

B) Low density polyethylene (LDPE), melting point: 102° C., melt flow rate: 45 g/10 min at 190° C.

C) Low density polyethylene (LDPE), melting point: 100° C., melt flow rate: 70 g/10 min at 190° C.

D) Linear short chain branching polyethylene (LLDPE), melting point: 124° C., melt flow rate: 100 g/10 min at 190° C.

E) Low density polyethylene (LDPE), melting point: 108° C., melt flow rate: 45 g/10 min at 190° C.

F) Linear short chain branching polyethylene (LLDPE), melting point: 124° C., melt flow rate: 50 g/10 min at 190° C.

G) High density polyethylene (HDPE), melting point: 133° C., melt flow rate: 40 g/10 min at 190° C.

Melting points for the thermoplastic resin in the Example were measured by differential scanning calorimetry (DSC).

TABLE 2

| | | | No. 4 | No. 5 | No. 6 | No. 7 | No. 8 | No. 9 | No. 10 | No. 11 | No. 12 | No. 13 |
|---|---|---|---|---|---|---|---|---|---|---|---|---|
| Thermoplastic resin (main) | | | A | A | A | A | A | A | A | A | A | A |
| Thermoplastic resin (sub) | | | — | B | B | B | C | C | C | D | D | D |
| Mixing ratio of thermoplastic resin (sub) (%) | | | — | 10 | 20 | 30 | 10 | 20 | 30 | 10 | 20 | 30 |
| Melt flow rate at 190° C. (g/10 min) | | | 5 | 6.2 | 7.8 | 9.7 | 6.5 | 8.5 | 11 | 6.7 | 9.1 | 12.3 |
| Film forming temperature (° C.) | | | 220 | 220 | 220 | 220 | 220 | 220 | 220 | 220 | 220 | 220 |
| Gap between rollers (mm) | | | 2.2 | 2.2 | 2.2 | 2.2 | 2.2 | 2.2 | 2.2 | 2.2 | 2.2 | 2.2 |
| Basis weight of thermoplastic resin layer (g/cm²) | | | 100 | 100 | 100 | 100 | 100 | 100 | 100 | 100 | 100 | 100 |
| Permeability of laminate before press molding (cc/cm²/sec) | Heating temperature | 150° C. | 8.75 | 2.45 | 15.07 | 4.11 | 6.15 | 5.40 | 18.79 | 5.22 | 5.19 | 9.46 |
| | | 170° C. | 22.51 | 2.24 | 8.55 | 17.13 | 5.45 | 14.85 | 20.12 | 6.47 | 6.89 | 9.03 |
| | | 190° C. | 9.16 | 2.48 | 7.07 | 11.14 | 4.64 | 10.89 | 13.96 | 2.93 | 9.50 | 9.07 |
| | | 210° C. | 12.56 | 4.54 | 8.24 | 4.19 | 5.46 | 4.12 | 14.34 | 2.17 | 7.04 | 12.03 |
| Permeability of vehicle floor carpet (cc/cm²/sec) | Heating temperature | 150° C. | 0.81 | 0.29 | 1.79 | 0.47 | 0.57 | 0.49 | 4.33 | 0.61 | 0.42 | 1.21 |
| | | 170° C. | 4.21 | 0.31 | 1.11 | 3.17 | 0.57 | 4.03 | 5.14 | 0.82 | 1.31 | 0.93 |
| | | 190° C. | 2.20 | 0.42 | 1.89 | 3.32 | 0.74 | 2.47 | 5.47 | 0.52 | 3.26 | 2.50 |
| | | 210° C. | 2.23 | 0.97 | 1.78 | 1.00 | 0.89 | 0.93 | 5.20 | 0.42 | 2.04 | 1.71 |

TABLE 3

|  |  | | No. 14 | No. 15 | No. 16 | No. 17 | No. 18 | No. 19 | No. 20 | No. 21 | No. 22 | No. 23 |
|---|---|---|---|---|---|---|---|---|---|---|---|---|
| Thermoplastic resin (main) | | | A | A | A | A | A | A | A | A | A | A |
| Thermoplastic resin (sub) | | | E | F | G | F | G | E | F | G | E | — |
| Mixing ratio of thermoplastic resin (sub) (%) | | | 30 | 30 | 30 | 10 | 10 | 10 | 10 | 10 | 10 | — |
| Melt flow rate at 190° C. (g/10 min) | | | 9.7 | 10 | 9.3 | 6.3 | 6.2 | 6.2 | 6.3 | 6.2 | 6.2 | 5 |
| Film forming temperature (° C.) | | | 220 | 220 | 220 | 200 | 200 | 200 | 220 | 220 | 220 | 200 |
| Gap between rollers (mm) | | | 2.2 | 2.2 | 2.2 | 2.2 | 2.2 | 2.2 | 2.2 | 2.2 | 2.2 | 2.2 |
| Basis weight of thermoplastic resin layer (g/cm$^2$) | | | 100 | 100 | 100 | 100 | 100 | 100 | 100 | 100 | 100 | 100 |
| Permeability of laminate before press molding (cc/cm$^2$/sec) | Heating temperature | 150° C. | 14.33 | 13.44 | 4.95 | 24.89 | 19.78 | 18.75 | 6.51 | 5.71 | 13.85 | 30.14 |
| | | 170° C. | 5.30 | 25.68 | 7.24 | 17.51 | 35.83 | 30.20 | 8.33 | 4.01 | 7.97 | 30.09 |
| | | 190° C. | 15.38 | 19.32 | 3.72 | 15.27 | 39.95 | 29.01 | 9.15 | 6.60 | 11.94 | 37.91 |
| | | 210° C. | 4.29 | 21.76 | 6.76 | 40.23 | 17.17 | 12.02 | 12.48 | 4.26 | 15.74 | 43.05 |
| Permeability of vehicle floor carpet (cc/cm$^2$/sec) | Heating temperature | 150° C. | 1.73 | 1.71 | 0.27 | 2.98 | 2.94 | 3.66 | 0.91 | 0.59 | 2.75 | 6.91 |
| | | 170° C. | 0.74 | 7.24 | 0.97 | 3.40 | 11.19 | 7.90 | 1.77 | 0.79 | 2.25 | 11.95 |
| | | 190° C. | 2.57 | 10.08 | 1.28 | 2.70 | 14.20 | 9.82 | 2.29 | 1.23 | 2.77 | 14.38 |
| | | 210° C. | 0.55 | 8.00 | 1.31 | 15.49 | 4.27 | 3.44 | 3.91 | 0.96 | 3.66 | 20.11 |

TABLE 4

|  |  | | No. 24 | No. 25 | No. 26 | No. 27 | No. 28 | No. 29 | No. 30 | No. 31 | No. 32 | No. 33 |
|---|---|---|---|---|---|---|---|---|---|---|---|---|
| Thermoplastic resin (main) | | | A | A | A | A | A | A | A | A | A | A |
| Thermoplastic resin (sub) | | | — | — | — | — | — | C | C | C | C | — |
| Mixing ratio of thermoplastic resin (sub) (%) | | | — | — | — | — | — | 10 | 10 | 10 | 10 | — |
| Melt flow rate at 190° C. (g/10 min) | | | 5 | 5 | 5 | 5 | 5 | 6.5 | 6.5 | 6.5 | 6.5 | 5 |
| Film forming temperature (° C.) | | | 200 | 200 | 200 | 200 | 200 | 200 | 200 | 200 | 200 | 210 |
| Gap between rollers (mm) | | | 2.7 | 3 | 2.2 | 2.2 | 2.2 | 2.2 | 2.2 | 2.2 | 2.7 | 2.2 |
| Basis weight of thermoplastic resin layer (g/cm$^2$) | | | 100 | 100 | 100 | 125 | 150 | 150 | 125 | 100 | 100 | 100 |
| Permeability of laminate before press molding (cc/cm$^2$/sec) | Heating temperature | 150° C. | 33.15 | 35.09 | 22.27 | 5.49 | 1.59 | 9.17 | 11.14 | 27.49 | 18.19 | 14.09 |
| | | 170° C. | 34.68 | 36.03 | 29.58 | 6.76 | 3.15 | 4.67 | 7.97 | 14.51 | 18.17 | 18.71 |
| | | 190° C. | 28.68 | 28.90 | 36.04 | 9.93 | 5.18 | 2.23 | 6.44 | 20.24 | 29.62 | 18.24 |
| | | 210° C. | 18.27 | 12.36 | 22.60 | 3.95 | 3.09 | 1.19 | 2.83 | 32.79 | 21.75 | 9.07 |
| Permeability of vehicle floor carpet (cc/cm$^2$/sec) | Heating temperature | 150° C. | 7.41 | 8.82 | 4.59 | 0.55 | 0.78 | 1.10 | 4.33 | 4.97 | 2.45 | 2.33 |
| | | 170° C. | 11.84 | 13.48 | 9.55 | 0.86 | 0.35 | 0.64 | 1.00 | 2.84 | 3.39 | 5.02 |
| | | 190° C. | 8.87 | 10.03 | 14.52 | 1.58 | 0.67 | 0.31 | 0.93 | 5.65 | 7.48 | 6.21 |
| | | 210° C. | 6.16 | 3.28 | 8.84 | 1.12 | 0.35 | 0.17 | 0.45 | 15.21 | 7.32 | 2.10 |

The measurement values under the respective conditions in Tables 2 to 4 are the averages of the five objects made under the same conditions.

2-2. Effect of Example 2

It is clear from results in Tables 2 to 4 that vehicle floor carpets were efficiently produced by forming the open hole parts 9 in the thermoplastic resin layer 71 in the heating process. Furthermore, use of the general-purpose production line and the general-purpose thermoplastic resin allowed the production of vehicle floor carpets at a lower cost than prior art.

It was confirmed from results of No. 4, 26, and 33 in Tables 2 or 4 that when the film forming temperature for the thermoplastic resin layer 71 is changed, the permeability of the vehicle floor carpet can be controlled. Specifically, it was confirmed that the permeability can be decreased by increasing the film forming temperature, and the permeability can be increased by decreasing the film forming temperature.

Furthermore, it was confirmed from results of No. 26 to 28 in Table 4 that when the basis weight of the thermoplastic resin layer 71 is changed, the permeability of the vehicle floor carpet can be controlled. Specifically, it was confirmed that the permeability can be decreased by increasing the basis weight, and the permeability can be increased by decreasing the basis weight.

It was confirmed from results of No. 5 to 7, 8 to 10, and 11 to 13 in Table 2 that when the melt flow rate of the thermoplastic resin is changed, the permeability of a vehicle floor carpet can be controlled. Specifically, it was confirmed that the permeability can be increased by increasing the melt flow rate of the resin by combination with other resin.

Furthermore, it was confirmed from results of No. 24 to 16 in Table 4 that when the heating temperature for the laminate or the gap between the rollers is changed, the permeability of the vehicle floor carpet can be controlled.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The invention is not limited to the above embodiments, and various modifications may be made without departing from the scope of the invention.

INDUSTRIAL APPLICABILITY

The vehicle floor carpet is suitably used in automobiles.

REFERENCE SIGN LIST

1: vehicle floor carpet, 3: skin layer, 3a: skin material, 31: skin layer, 5: base layer, 5a: base material, 51: base layer, 7: thermoplastic resin layer, 7a: thermoplastic resin, 71: thermoplastic resin layer, 9: open hole part, 11: recess, 13: extruder, 15: non-contact part, 100: laminate, 101: laminate having open hole parts, Ra, Rb: roller, L: low temperature region, H: high temperature region.

The invention claimed is:

1. A vehicle floor carpet comprising:
   a skin layer, a thermoplastic resin layer, and a base layer in this order;
   a plurality of internal recesses formed on at least one of a surface of the skin layer and a surface of the base layer at a side interfacing with the thermoplastic resin layer, wherein the plurality of internal recesses are present in the at least one of the surface of the skin layer and the surface of the base layer because a material comprising at least one of the skin layer and the base layer is a fiber material, and
   a thermoplastic resin layer having a melt flow rate in a range from 2 to 100 g/10 minutes and a plurality of thermally-formed cavities penetrating through the thermoplastic resin layer in the thickness direction,
   wherein the thermally-formed cavities are formed to extend from the plurality of formed internal recesses, respectively, due to an increased thermal conductivity within the plurality of internal recesses.

2. The vehicle floor carpet according to claim 1, wherein a permeability is in a range from 5 to 30 cc/cm$^2$/sec.

3. The vehicle floor carpet according to claim 1, wherein a basis weight of the thermoplastic resin layer is in a range from 50 to 150 g/m$^2$.

4. The vehicle floor carpet according to claim 1, wherein the melt flow rate is 4 or higher and less than 50 g/10 min.

5. The vehicle floor carpet according to claim 4, wherein the melt flow rate is 5 or higher and less than 10 g/10 min.

6. The vehicle floor carpet according to claim 1, wherein the fiber material of the skin layer and/or base layer is a nonwoven fabric.

7. The vehicle floor carpet according to claim 1, wherein the thermoplastic resin layer is formed from a thermoplastic resin comprising at least one of a polyethylene, a polypropylene, and an ethylene-vinyl acetate resins.

8. The vehicle floor carpet according to claim 7, wherein the polyethylene resin is a low density polyethylene (LDPE).

9. A method for producing the vehicle floor carpet according to claim 1, comprising the steps of:
   (a) forming a laminate including the skin layer, the thermoplastic resin layer, and the base layer in this order;
   (b) heating the laminate to form the plurality of thermally-formed cavities penetrating through the thermoplastic resin layer in the thickness direction; and
   (c) press-molding the laminate having thermally-formed cavities,
   wherein the step (a) forms the laminate in which the skin layer and base layer are bonded via the thermoplastic layer so that non-contact parts are formed at least one of an interface between the skin layer and the thermoplastic resin layer and an interface between the thermoplastic resin layer and the base layer.

10. The method for producing the vehicle floor carpet according to claim 9, wherein a film forming temperature for the thermoplastic resin layer in the step (a) is in a range from 200° C. to 220° C.

11. The method for producing the vehicle floor carpet according to claim 9, wherein a basis weight of the thermoplastic resin layer in the step (a) is in a range from 50 to 150 g/m$^2$.

* * * * *